Dec. 29, 1953  F. E. KOSINSKI  2,664,005
CULINARY UTENSIL HOLDER
Filed Aug. 24, 1949
Fig. 1.
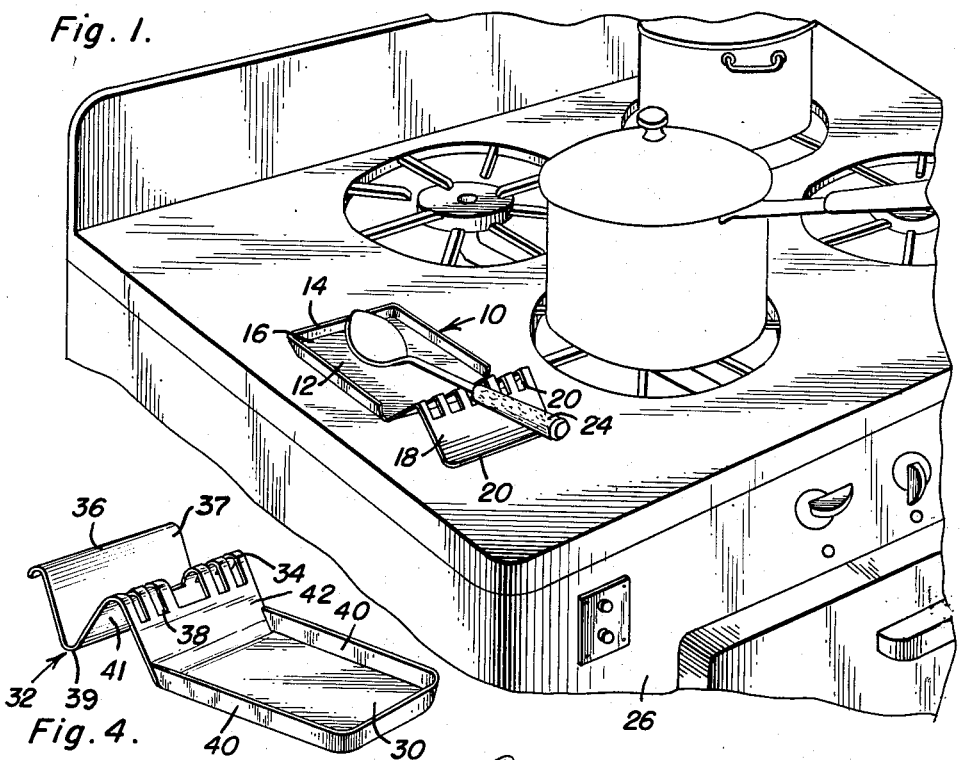
Fig. 4.
Fig. 2.
Fig. 3.
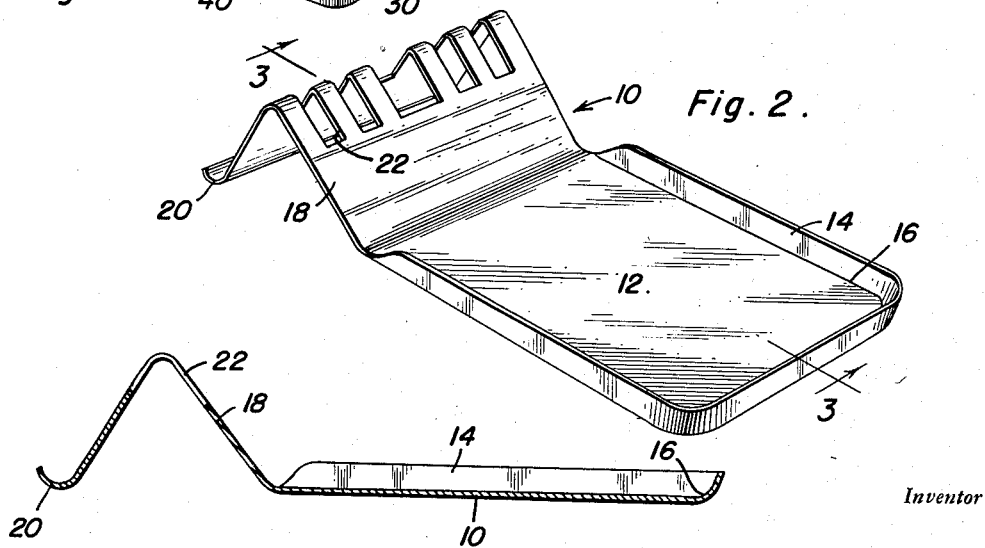
Inventor
Frank E. Kosinski
By *Clarence A. O'Brien
and Harvey B. Jacobson*
Attorneys

Patented Dec. 29, 1953

2,664,005

UNITED STATES PATENT OFFICE 2,664,005

CULINARY UTENSIL HOLDER

Frank E. Kosinski, Detroit, Mich.

Application August 24, 1949, Serial No. 112,119

1 Claim. (Cl. 65—65)

This invention relates to new and useful improvements in culinary utensil holders and the primary object of the present invention is to provide a holder that is placed upon a stove to keep the top and finish of the stove clean of unsightly spots due to the drippings of grease and the like from spoons, forks and spatulas used in preparing foods for consumption at the table.

Yet another object of the present invention is to provide a holder that will support spoons and/or other utensils used for stirring and mixing foods and including a tray that will receive the drippings from the utensils and thereby prevent the drippings from passing onto a stove.

Another important object of the present invention is to provide a culinary utensil holder that is so constructed as to permit the same to be quickly and readily cleaned in a convenient manner.

A further object of the present invention is to provide a culinary utensil including a means for cracking eggs and receiving the shells of the eggs.

A still further aim of the present invention is to provide a culinary utensil holder that is small and compact in structure, simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the present invention supported on a stove and in use;

Figure 2 is a perspective view of the present invention;

Figure 3 is a longitudinal vertical sectional view taken substantially on the plane of section line 3—3 of Figure 2; and, Figure 4 is a perspective view of the present invention in slightly modified form.

Referring now to the drawings in detail, wherein for the purpose of illustration, there is disclosed a preferred embodiment of the present invention, the numeral 10 represents the culinary utensil holder generally. This holder is constructed from a single blank of easily bendable and cleanable material, such as stainless steel, sheet metal or plastic.

The holder 10 is composed of an elongated tray 12 having an upwardly and outwardly inclined flange portion 14 that encloses both of its sides and one of its ends. The juncture of the flange portion 14 with the tray bottom is formed with a curvature, as at 16, so that the same can be conveniently cleaned.

The end of the tray 10 not provided with the flange portion, is formed with the inner leg of an inverted substantially V-shaped member 18. The member 18 is disposed transversely of the tray 10 and the edge of its outer leg portion is rolled outwardly and upwardly to provide a bearing foot or channel 20.

The web of the V-shaped member 18 is disposed well above the tray and at one end of the tray, and the web and leg portions of the member 18 are notched or slotted, as at 22, to receive the handles of culinary utensils, such as 24, and thereby retain the utensils in vertically inclined positions so that any material on the utensils will pass onto the tray rather than the stove 26 on which the tray is supported.

The web or apex of the V-shaped member 18 also constitutes a means whereby eggs may be cracked.

Reference is now directed to Figure 4 wherein there is disclosed the present invention in slightly modified form. In this embodiment, one end of the tray 30 is integrally formed with the inner leg portion 42 of an inverted V-shaped member 32 that extends transversely of the tray at one end thereof.

The outer leg portion 41 of member 32 is integrally formed with the upwardly facing concavo-convexed lower flange 39 of an upwardly inclined plate 37 having a downwardly and outwardly extending convexo-concave upper flange 36 at its upper portion. Flange 36 is in a horizontal plane with the apex element 34 of member 32 and will form a rest for the handles of utensils which extend through spaced slots 38 in the apex element 34.

The upstanding flange portions 40 of the tray 30 extend to and are joined with the leg portion 42 of the V-shaped member 32 to reinforce and strengthen the entire structure and to aid in retaining drippings upon the tray. Obviously, the flange portions 14 of the tray 12 could also be extended to the member 18 to function similarly to the flanged portions 40 of the tray 30.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A device for holding culinary utensils on a supporting structure so as to prevent the material on the utensils from contacting the structure and which device is also adapted to provide a means for breaking and holding eggs, said device being constructed from a single blank of bendable and easily cleanable material and comprising an elongated flat wall having relatively low upstanding joined flanges at its side edges and one of its end edges, an inverted V-shaped member extending transversely of the wall and having inner and outer leg portions and an apex element joining said leg portions and disposed well above the flanges of said flat wall, the inner leg portion of said member being integrally formed with the other end edge of said wall, an upwardly inclined plate disposed transversely of the wall and having a lower upwardly facing concavo-convexed flange integrally formed with the outer leg portion of said member, and said plate also having a downwardly facing convexo-concave upper flange at its upper portion, the apex element of said member lying in a horizontal plane with said upper flange and having a series of spaced notches therein for receiving the handles of utensils that rest upon the upper edge of said plate.

FRANK E. KOSINSKI.

References Cited in the file of this patent

UNITED STATES PATENTS

| Number | Name | Date |
|---|---|---|
| D. 48,039 | Niper | Oct. 26, 1915 |
| 72,009 | Foster | Dec. 10, 1867 |
| 283,066 | Block | Aug. 14, 1883 |
| 784,499 | Padmore | Mar. 7, 1905 |
| 1,370,525 | Eisenkraft | Mar. 8, 1921 |
| 1,390,157 | Ohde | Sept. 6, 1921 |
| 1,661,787 | Chisholm | Mar. 6, 1928 |
| 1,754,713 | Green | Apr. 15, 1930 |
| 1,762,635 | Lambert | June 10, 1930 |
| 1,857,372 | Gleason | May 10, 1932 |
| 1,886,075 | Zorsch | Nov. 1, 1932 |
| 1,949,285 | Porter | Feb. 27, 1934 |
| 2,042,801 | Pittman | June 2, 1936 |
| 2,180,540 | Moebus et al. | Nov. 21, 1939 |
| 2,511,542 | Rau | June 13, 1950 |

FOREIGN PATENTS

| Number | Country | Date |
|---|---|---|
| 2,043 | Great Britain | Jan. 26, 1911 |